United States Patent
Kliger et al.

(10) Patent No.: US 8,942,220 B2
(45) Date of Patent: *Jan. 27, 2015

(54) METHOD AND APPARATUS FOR POLICING A FLOW IN A NETWORK

(71) Applicant: Broadcom Corporation, Irvine, CA (US)

(72) Inventors: Avi Kliger, Ramat Gan (IL); Yitshak Ohana, Givat Zeev (IL); Philippe Klein, Jerusalem (IL)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/072,618

(22) Filed: Nov. 5, 2013

(65) Prior Publication Data

US 2014/0056138 A1 Feb. 27, 2014

Related U.S. Application Data

(63) Continuation of application No. 13/031,688, filed on Feb. 22, 2011, now Pat. No. 8,611,327.

(60) Provisional application No. 61/306,623, filed on Feb. 22, 2010.

(51) Int. Cl.
*H04B 7/212* (2006.01)
*H04L 12/813* (2013.01)
(Continued)

(52) U.S. Cl.
CPC .............. *H04L 47/20* (2013.01); *H04L 41/5022* (2013.01); *H04L 47/781* (2013.01); *H04L 47/805* (2013.01)
USPC ........... 370/346; 370/236; 370/255; 370/278; 370/282; 370/332

(58) Field of Classification Search
USPC .......... 370/230, 232, 235, 236, 255, 278, 282, 370/329, 332, 348
See application file for complete search history.

(56) References Cited

U.S. PATENT DOCUMENTS

| 3,836,888 | A | 9/1974 | Boenke et al. |
| 4,413,229 | A | 11/1983 | Grant |

(Continued)

FOREIGN PATENT DOCUMENTS

| CN | 1422043 A | 6/2003 |
| CN | 1588827 A | 3/2005 |

(Continued)

OTHER PUBLICATIONS

International Search Report for International Application No. PCT/US03/27253 dated Dec. 30, 2003 (4 pgs).

(Continued)

*Primary Examiner* — Benjamin H Elliott, IV
(74) *Attorney, Agent, or Firm* — McDermott Will & Emery LLP

(57) ABSTRACT

An example of a method of policing a flow in a home network such as a MoCA network may include calculating a policing period, calculating a first credit parameter, initializing a first usage variable at a beginning of the policing period, receiving a packet at an ingress node, calculating the first usage variable based on a first formula, determining whether the first usage variable is less than or equal to the first credit parameter, and making a reservation request when the first usage variable is less than or equal to the first credit parameter. The reservation request is different from an opportunistic reservation request. Examples of a system and a computer program product having instructions stored in a tangible computer-readable storage medium are also provided.

20 Claims, 4 Drawing Sheets

(51) Int. Cl.
  *H04L 12/24* (2006.01)
  *H04L 12/911* (2013.01)
  *H04L 12/927* (2013.01)

(56) References Cited

U.S. PATENT DOCUMENTS

| | | |
|---|---|---|
| 4,536,875 A | 8/1985 | Kume et al. |
| 4,608,685 A | 8/1986 | Jain et al. |
| 4,893,326 A | 1/1990 | Duran et al. |
| 5,052,029 A | 9/1991 | James et al. |
| 5,170,415 A | 12/1992 | Yoshida et al. |
| 5,343,240 A | 8/1994 | Yu |
| 5,421,030 A | 5/1995 | Baran |
| 5,440,335 A | 8/1995 | Beveridge |
| 5,570,355 A | 10/1996 | Dail et al. |
| 5,638,374 A | 6/1997 | Heath |
| 5,671,220 A | 9/1997 | Tonomura |
| 5,796,739 A | 8/1998 | Kim et al. |
| 5,802,173 A | 9/1998 | Hamilton-Piercy et al. |
| 5,805,591 A | 9/1998 | Naboulsi et al. |
| 5,805,806 A | 9/1998 | McArthur |
| 5,815,662 A | 9/1998 | Ong |
| 5,822,677 A | 10/1998 | Peyrovian |
| 5,822,678 A | 10/1998 | Evanyk |
| 5,845,190 A | 12/1998 | Bushue et al. |
| 5,850,400 A | 12/1998 | Eames et al. |
| 5,854,887 A | 12/1998 | Kindell et al. |
| 5,856,975 A | 1/1999 | Rostoker et al. |
| 5,877,821 A | 3/1999 | Newlin et al. |
| 5,886,732 A | 3/1999 | Humpleman |
| 5,896,556 A | 4/1999 | Moreland et al. |
| 5,917,624 A | 6/1999 | Wagner |
| 5,930,493 A | 7/1999 | Ottesen et al. |
| 5,963,844 A | 10/1999 | Dail |
| 5,982,784 A | 11/1999 | Bell |
| 6,009,465 A | 12/1999 | Decker et al. |
| 6,028,860 A | 2/2000 | Laubach et al. |
| 6,055,242 A | 4/2000 | Doshi et al. |
| 6,069,588 A | 5/2000 | O'Neill, Jr. |
| 6,081,519 A | 6/2000 | Petler |
| 6,081,533 A | 6/2000 | Laubach et al. |
| 6,111,911 A | 8/2000 | Sanderford, Jr. et al. |
| 6,118,762 A | 9/2000 | Nomura et al. |
| 6,157,645 A | 12/2000 | Shobatake |
| 6,167,120 A | 12/2000 | Kikinis |
| 6,192,070 B1 | 2/2001 | Poon et al. |
| 6,219,409 B1 | 4/2001 | Smith et al. |
| 6,229,818 B1 | 5/2001 | Bell |
| 6,243,413 B1 | 6/2001 | Beukema |
| 6,304,552 B1 | 10/2001 | Chapman et al. |
| 6,307,862 B1 | 10/2001 | Silverman |
| 6,434,151 B1 | 8/2002 | Caves et al. |
| 6,466,651 B1 | 10/2002 | Dailey |
| 6,481,013 B1 | 11/2002 | Dinwiddie et al. |
| 6,526,070 B1 | 2/2003 | Bernath et al. |
| 6,553,568 B1 | 4/2003 | Fijolek et al. |
| 6,563,829 B1 | 5/2003 | Lyles et al. |
| 6,567,654 B1 | 5/2003 | Coronel Arredondo et al. |
| 6,611,537 B1 | 8/2003 | Edens et al. |
| 6,622,304 B1 | 9/2003 | Carhart |
| 6,637,030 B1 | 10/2003 | Klein |
| 6,650,624 B1 | 11/2003 | Quigley et al. |
| 6,745,392 B1 | 6/2004 | Basawapatna et al. |
| 6,763,032 B1 | 7/2004 | Rabenko et al. |
| 6,785,296 B1 | 8/2004 | Bell |
| 6,816,500 B1 | 11/2004 | Mannette et al. |
| 6,831,899 B1 | 12/2004 | Roy |
| 6,836,515 B1 | 12/2004 | Kay et al. |
| 6,859,899 B2 | 2/2005 | Shalvi et al. |
| 6,862,270 B1 | 3/2005 | Ho |
| 6,877,043 B2 | 4/2005 | Mallory et al. |
| 6,877,166 B1 | 4/2005 | Roeck et al. |
| 6,898,210 B1 | 5/2005 | Cheng et al. |
| 6,930,989 B1 | 8/2005 | Jones, IV et al. |
| 6,940,833 B2 | 9/2005 | Jonas et al. |
| 6,950,399 B1 | 9/2005 | Bushmitch et al. |
| 6,961,314 B1 | 11/2005 | Quigley et al. |
| 6,985,437 B1 | 1/2006 | Vogel |
| 6,996,198 B2 | 2/2006 | Cvetkovic |
| 7,035,270 B2 | 4/2006 | Moore, Jr. et al. |
| 7,065,779 B1 | 6/2006 | Crocker et al. |
| 7,089,580 B1 | 8/2006 | Vogel et al. |
| 7,116,685 B2 | 10/2006 | Brown et al. |
| 7,127,734 B1 | 10/2006 | Amit |
| 7,133,697 B2 | 11/2006 | Judd et al. |
| 7,142,553 B1 | 11/2006 | Ojard et al. |
| 7,146,632 B2 | 12/2006 | Miller |
| 7,149,220 B2 | 12/2006 | Beukema et al. |
| 7,194,041 B2 | 3/2007 | Kadous |
| 7,292,527 B2 | 11/2007 | Zhou et al. |
| 7,296,083 B2 | 11/2007 | Barham et al. |
| 7,327,754 B2 | 2/2008 | Mills et al. |
| 7,372,853 B2 | 5/2008 | Sharma et al. |
| 7,460,543 B2 | 12/2008 | Malik et al. |
| 7,487,532 B2 | 2/2009 | Robertson et al. |
| 7,532,642 B1 | 5/2009 | Peacock |
| 7,532,693 B1 | 5/2009 | Narasimhan |
| 7,555,064 B2 | 6/2009 | Beadle |
| 7,574,615 B2 | 8/2009 | Weng et al. |
| 7,606,256 B2 | 10/2009 | Vitebsky et al. |
| 7,652,527 B2 | 1/2010 | Ido et al. |
| 7,653,164 B2 | 1/2010 | Lin et al. |
| 7,664,065 B2 | 2/2010 | Lu |
| 7,675,970 B2 | 3/2010 | Nemiroff et al. |
| 7,697,522 B2 | 4/2010 | Kliger et al. |
| 7,742,495 B2 | 6/2010 | Kliger et al. |
| 7,782,850 B2 | 8/2010 | Kliger et al. |
| 7,783,259 B2 | 8/2010 | Dessert et al. |
| 7,817,642 B2 | 10/2010 | Ma et al. |
| 7,860,092 B2 | 12/2010 | Yoon et al. |
| 7,916,756 B2 | 3/2011 | Atsumi et al. |
| 8,090,043 B2 | 1/2012 | Levi et al. |
| 8,098,770 B2 | 1/2012 | Shusterman |
| 8,184,550 B2 | 5/2012 | Beck et al. |
| 2001/0039660 A1 | 11/2001 | Vasilevsky et al. |
| 2002/0010562 A1 | 1/2002 | Schleiss et al. |
| 2002/0059623 A1 | 5/2002 | Rodriguez et al. |
| 2002/0059634 A1 | 5/2002 | Terry et al. |
| 2002/0069417 A1 | 6/2002 | Kliger et al. |
| 2002/0078247 A1 | 6/2002 | Lu et al. |
| 2002/0078249 A1 | 6/2002 | Lu et al. |
| 2002/0097821 A1 | 7/2002 | Hebron et al. |
| 2002/0105970 A1 | 8/2002 | Shvodian |
| 2002/0136231 A1 | 9/2002 | Leatherbury et al. |
| 2002/0141347 A1 | 10/2002 | Harp et al. |
| 2002/0150155 A1 | 10/2002 | Florentin et al. |
| 2002/0166124 A1 | 11/2002 | Gurantz et al. |
| 2002/0174423 A1 | 11/2002 | Fifield et al. |
| 2002/0194605 A1 | 12/2002 | Cohen et al. |
| 2003/0013453 A1 | 1/2003 | Lavaud et al. |
| 2003/0016751 A1 | 1/2003 | Vetro et al. |
| 2003/0022683 A1 | 1/2003 | Beckmann et al. |
| 2003/0060207 A1 | 3/2003 | Sugaya et al. |
| 2003/0063563 A1 | 4/2003 | Kowalski |
| 2003/0066082 A1 | 4/2003 | Kliger et al. |
| 2003/0099253 A1 | 5/2003 | Kim |
| 2003/0152059 A1 | 8/2003 | Odman |
| 2003/0169769 A1 | 9/2003 | Ho et al. |
| 2003/0193619 A1 | 10/2003 | Farrand |
| 2003/0198244 A1 | 10/2003 | Ho et al. |
| 2004/0004934 A1 | 1/2004 | Zhu et al. |
| 2004/0037366 A1 | 2/2004 | Crawford |
| 2004/0047284 A1 | 3/2004 | Eidson |
| 2004/0107445 A1 | 6/2004 | Amit |
| 2004/0163120 A1 | 8/2004 | Rabenko et al. |
| 2004/0172658 A1 | 9/2004 | Rakib et al. |
| 2004/0177381 A1 | 9/2004 | Kliger et al. |
| 2004/0224715 A1 | 11/2004 | Rosenlof et al. |
| 2004/0258062 A1 | 12/2004 | Narvaez |
| 2005/0015703 A1 | 1/2005 | Terry et al. |
| 2005/0097196 A1 | 5/2005 | Wronski et al. |
| 2005/0152350 A1 | 7/2005 | Sung et al. |
| 2005/0152359 A1 | 7/2005 | Giesberts et al. |
| 2005/0175027 A1 | 8/2005 | Miller et al. |

(56) References Cited

U.S. PATENT DOCUMENTS

| | | |
|---|---|---|
| 2005/0204066 A9 | 9/2005 | Cohen et al. |
| 2005/0213405 A1 | 9/2005 | Stopler |
| 2006/0059400 A1 | 3/2006 | Clark et al. |
| 2006/0062250 A1 | 3/2006 | Payne |
| 2006/0078001 A1 | 4/2006 | Chandra et al. |
| 2006/0104201 A1 | 5/2006 | Sundberg et al. |
| 2006/0256799 A1 | 11/2006 | Eng |
| 2006/0256818 A1 | 11/2006 | Shvodian et al. |
| 2006/0268934 A1 | 11/2006 | Shimizu et al. |
| 2006/0280194 A1 | 12/2006 | Jang et al. |
| 2007/0025317 A1 | 2/2007 | Bolinth et al. |
| 2007/0040947 A1 | 2/2007 | Koga |
| 2007/0127373 A1 | 6/2007 | Ho et al. |
| 2007/0160213 A1 | 7/2007 | Un et al. |
| 2007/0171919 A1 | 7/2007 | Godman et al. |
| 2007/0183786 A1 | 8/2007 | Hinosugi et al. |
| 2007/0206551 A1 | 9/2007 | Moorti et al. |
| 2007/0217436 A1 | 9/2007 | Markley et al. |
| 2007/0253379 A1 | 11/2007 | Kumar et al. |
| 2007/0286121 A1 | 12/2007 | Kolakowski et al. |
| 2008/0037487 A1 | 2/2008 | Li et al. |
| 2008/0037589 A1 | 2/2008 | Kliger et al. |
| 2008/0080369 A1 | 4/2008 | Sumioka et al. |
| 2008/0089268 A1 | 4/2008 | Kinder et al. |
| 2008/0178229 A1 | 7/2008 | Kliger et al. |
| 2008/0189431 A1 | 8/2008 | Hyslop et al. |
| 2008/0212591 A1 | 9/2008 | Wu et al. |
| 2008/0225832 A1 | 9/2008 | Kaplan et al. |
| 2008/0238016 A1 | 10/2008 | Chen et al. |
| 2008/0271094 A1 | 10/2008 | Kliger et al. |
| 2008/0273591 A1 | 11/2008 | Brooks et al. |
| 2008/0279219 A1 | 11/2008 | Wu et al. |
| 2008/0298241 A1 | 12/2008 | Ohana et al. |
| 2009/0063878 A1 | 3/2009 | Schmidt et al. |
| 2009/0092154 A1 | 4/2009 | Malik et al. |
| 2009/0106801 A1 | 4/2009 | Horii |
| 2009/0122901 A1 | 5/2009 | Choi et al. |
| 2009/0165070 A1 | 6/2009 | McMullin et al. |
| 2009/0217325 A1 | 8/2009 | Kliger et al. |
| 2009/0252172 A1 | 10/2009 | Hare |
| 2009/0254794 A1 | 10/2009 | Malik et al. |
| 2009/0257483 A1 | 10/2009 | French et al. |
| 2009/0285212 A1 | 11/2009 | Chu et al. |
| 2009/0296578 A1 | 12/2009 | Bernard et al. |
| 2009/0316589 A1 | 12/2009 | Shafeeu |
| 2010/0031297 A1 | 2/2010 | Klein et al. |
| 2010/0080312 A1 | 4/2010 | Moffatt et al. |
| 2010/0150016 A1 | 6/2010 | Barr |
| 2010/0158013 A1 | 6/2010 | Kliger et al. |
| 2010/0158015 A1 | 6/2010 | Wu |
| 2010/0158021 A1 | 6/2010 | Kliger et al. |
| 2010/0158022 A1 | 6/2010 | Kliger et al. |
| 2010/0162329 A1 | 6/2010 | Ford et al. |
| 2010/0174824 A1 | 7/2010 | Aloni et al. |
| 2010/0185731 A1 | 7/2010 | Wu |
| 2010/0185759 A1 | 7/2010 | Wu |
| 2010/0214916 A1 | 8/2010 | Wu et al. |
| 2010/0238932 A1 | 9/2010 | Kliger et al. |
| 2010/0246586 A1 | 9/2010 | Ohana et al. |
| 2010/0254278 A1 | 10/2010 | Kliger et al. |
| 2010/0254402 A1 | 10/2010 | Kliger et al. |
| 2010/0281195 A1 | 11/2010 | Daniel et al. |
| 2010/0284474 A1 | 11/2010 | Kliger et al. |
| 2010/0290461 A1 | 11/2010 | Kliger et al. |
| 2010/0322134 A1 | 12/2010 | Wu |
| 2011/0001833 A1 | 1/2011 | Grinkemeyer et al. |
| 2011/0013633 A1 | 1/2011 | Klein et al. |
| 2011/0080850 A1 | 4/2011 | Klein et al. |
| 2011/0205891 A1 | 8/2011 | Kliger et al. |
| 2011/0206042 A1 | 8/2011 | Tarrab et al. |
| 2011/0310907 A1 | 12/2011 | Klein et al. |

FOREIGN PATENT DOCUMENTS

| | | | |
|---|---|---|---|
| EP | 0385695 | A2 | 9/1990 |
| EP | 0622926 | A2 | 11/1994 |
| EP | 1501326 | A1 | 1/2005 |
| JP | 60160231 | A | 8/1985 |
| WO | 98/27748 | A2 | 6/1998 |
| WO | 98/31133 | A2 | 7/1998 |
| WO | 99/35753 | A2 | 7/1999 |
| WO | 99/46734 | A1 | 9/1999 |
| WO | 00/31725 | A1 | 6/2000 |
| WO | 00/55843 | A1 | 9/2000 |
| WO | 01/80030 | A1 | 10/2001 |
| WO | 02/19623 | A2 | 3/2002 |

OTHER PUBLICATIONS

International Search Report for International Application No. PCT/US03/27254 dated Feb. 3, 2004 (5 pgs).

"MoCA: Ubiquitous Multimedia Networking in the Home, Proc of SPIE vol. 6776 67760C-1", Shlomo Ovadia, SPIE, Bellingham, WA, May 28, 2010.

"MoCA Brewing Up Bigger Bandwidth, CTO Anton Monk Outlines Plans for MoCA 2.0 Home-Networking Specification" (<http://www.multichannel.com/article/160878-MoCa_Brewing_Up_bigger_Bandwidth.php>), Multichannel News, New York, NY, Dec. 15, 2008.

"Home Networking on Coax for Video and Multimedia, Overview for IEEE 802.1AVB", Shlomo Ovadia, San Ramon, California, May 30, 2007.

"Microtune Introduces Industry's First 1-GHZ Cable Tuners Compatible with MoCA—Home Networking Standard", Business Wire, San Francisco, California, Mar. 19, 2007.

METHOD AND APPARATUS FOR POLICING A FLOW IN A NETWORK

CROSS-REFERENCED TO RELATED APPLICATIONS

This application is a continuation of U.S. patent application Ser. No. 13/031,688 filed Feb. 22, 2011, entitled "METHOD AND APPARATUS FOR POLICING A QoS FLOW IN A MoCA 2.0 NETWORK", which is a non-provisional of U.S. Provisional Patent No. 61/306,623, filed Feb. 22, 2010, entitled "PQoS Policing Support for MoCA 2.0" both of which are incorporated by reference herein in their entirety.

FIELD

In one or more implementations, the disclosure relates generally to managing bandwidth of a network.

BACKGROUND

Home network technologies using coax are known generally. The Multimedia over Coax Alliance (MoCAT™), at its website mocalliance.org, provides an example of a suitable specification (MoCA 2.0) for networking of digital video and entertainment through existing coaxial cable in the home which has been distributed to an open membership. The MoCA 2.0 specification is incorporated by reference herein in its entirety.

Home networking over coax taps into the vast amounts of unused bandwidth available on the in-home coax. More than 70% of homes in the United States have coax already installed in the home infrastructure. Many have existing coax in one or more primary entertainment consumption locations such as family rooms, media rooms and master bedrooms—ideal for deploying networks. Home networking technology allows homeowners to utilize this infrastructure as a networking system and to deliver other entertainment and information programming, organized as data flows, with high Quality of Service. A Quality of Service (QoS) flow may have parameters governing the network that must be met to obtain the required QoS. Therefore the MoCA specification gives priority to requests by a QoS flow for network resources. The priority given to a QoS flow permits abuse of the network by the QoS flow.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
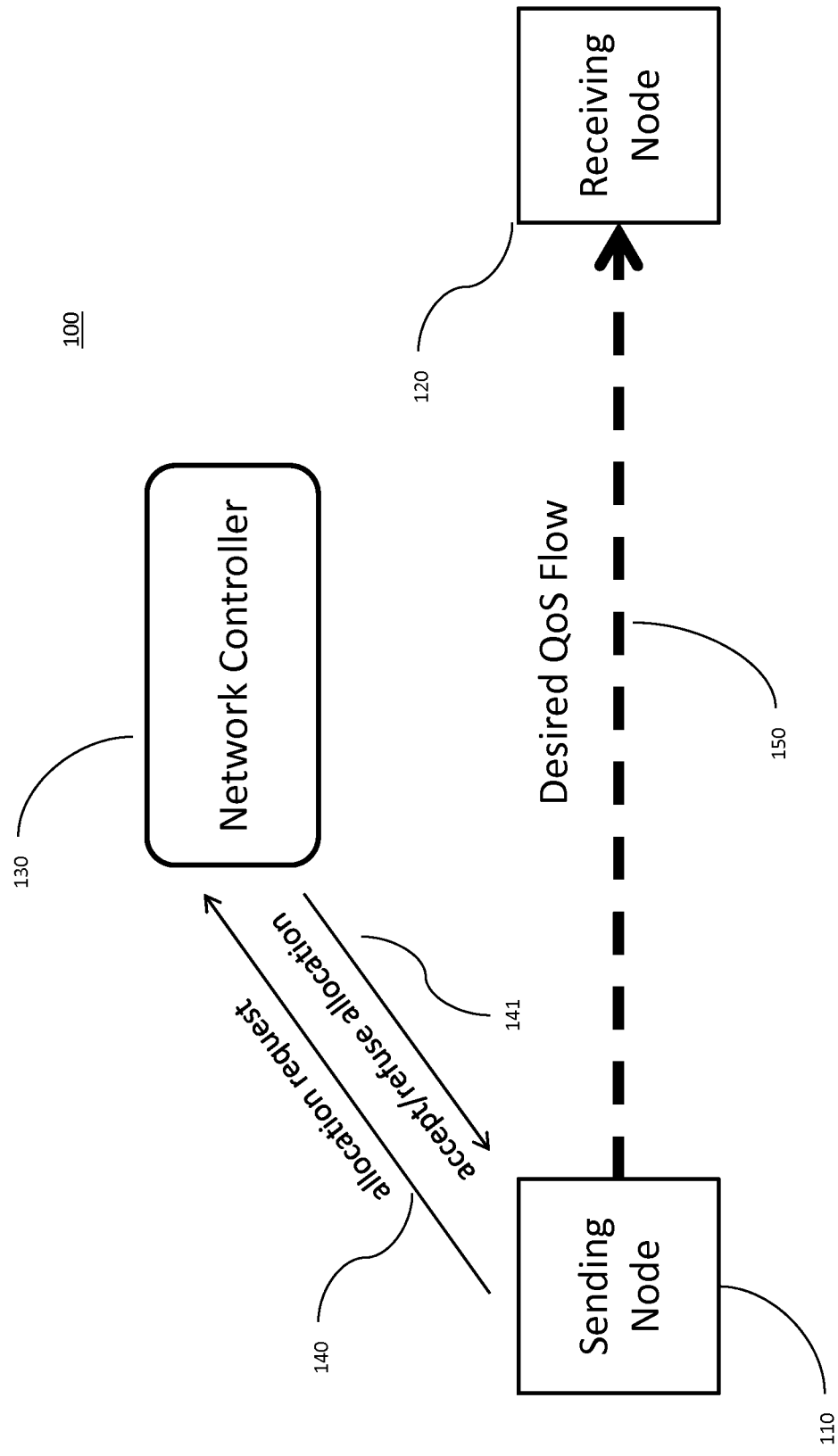
FIG. 1A shows a schematic diagram of an exemplary implementation of messages exchanged during a request for the allocation of a QoS flow.

In the following description of the various embodiments, reference is made to the accompanying drawings, which form a part hereof, and in which is shown by way of illustration various embodiments in which the subject technology may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, flash technology and/or any combination thereof.

In addition, various signals representing data or events as described herein may be transferred between a source and a destination in the form of electromagnetic waves traveling through signal-conducting media such as metal wires, optical fibers, and/or wireless transmission media (e.g., air and/or space).

Certain services implemented over the MoCA network may require the MoCA network to provide a data flow that has reserved bandwidth and special access to bandwidth. Such a flow may more specifically be termed a Parameterized QoS ("PQoS") flow. A PQoS flow will receive guaranteed bandwidth from a network, preferably from a network controller—i.e., an RR on behalf of a QoS flow will have priority over some other flows.

Nodes in a MoCA network acquire bandwidth by making a Reservation Request (RR). Multiple Reservation Requests may be made by a single node depending on bandwidth needs of a flow sourced by that node. The reservation requests may be made by a node to a network controller which may grant the request. An RR is granted when it has sufficient priority over other requests. In the alternative a node may reserve bandwidth by making an Opportunistic Reservation Request (ORR). An ORR for a PQoS is granted by the network controller when bandwidth is readily available—e.g., the bandwidth would be unused if not consumed by the ORR, and all PQoS related RRs have already been granted. An ORR may have lower priority than some other requests.

The guaranteed treatment of the PQoS may be abused leading to difficulties for other flows in the network. An example of abuse may be shown when a first QoS flow is established and a second QoS flow is then established. The second flow may actually request more bandwidth then guaranteed to it by the network controller. In such circumstances, a suitable QoS for the first flow, which was also previously guaranteed bandwidth, cannot be maintained.

Control or policing of QoS flow requests may be performed by the network controller, but this method has disadvantages—the network controller must be able to balance potentially abusive requests from one node against requests from another node. Another approach relies on each node policing its own ingress flows. An ingress flow is defined as a flow that is an ingress or an input to the network—i.e., a flow from a node that is the source of data.

It should be noted that the term packet is used throughout the description. In one or more implementations, packets may be understood to refer to a MoCA term, MAC Service Data Units (MSDU).

In one or more implementations, bandwidth of a network may be understood to refer to the amount of information sent over data flows in the network. In one or more implementations, managing relates to policing—i.e., controlling—the use of at least one QoS flow in a network where the at least one QoS flow may have priority over other flows. In one or more implementations, it would be desirable to provide a policing mechanism to police the use of bandwidth in a MoCA network by a QoS flow.

In one or more implementations, a system and/or method provides a policing mechanism. In one or more implementations, a system and/or method provides a policing mechanism to control the use of bandwidth in a MoCA network by a QoS flow.

FIG. 1A shows an exemplary network 100 comprising a sending node 110, a receiving node 120 and a network controller 130. The sending node 110 may also be called an ingress node. The sending node 110 may seek to establish a QoS flow through the connection 150 between itself and receiving node 120. The sending node 110 may send a request for allocation 140 to network controller 130. The request for allocation 140 may comprise a list of requirements for a QoS flow. Network controller 130 sends a response 141 to the sending node. The response may be positive—i.e., the allocation is reserved—or the response may be negative.

Although the example network 100 shows a single sending node and a single receiving node, other configurations are contemplated and included within the scope of the disclosure. Alternative embodiments may include multiple sending nodes, multiple receiving nodes and multiple nodes that can both send and receive. Any of these configurations may share network resources. Although a single network controller is shown other configurations—e.g., multiple network controllers—are contemplated and included within the scope of the disclosure. Any suitable combination of sending nodes, receiving nodes, transceiving nodes and network controllers are contemplated and included within the scope of the disclosure.

Figure 1B:
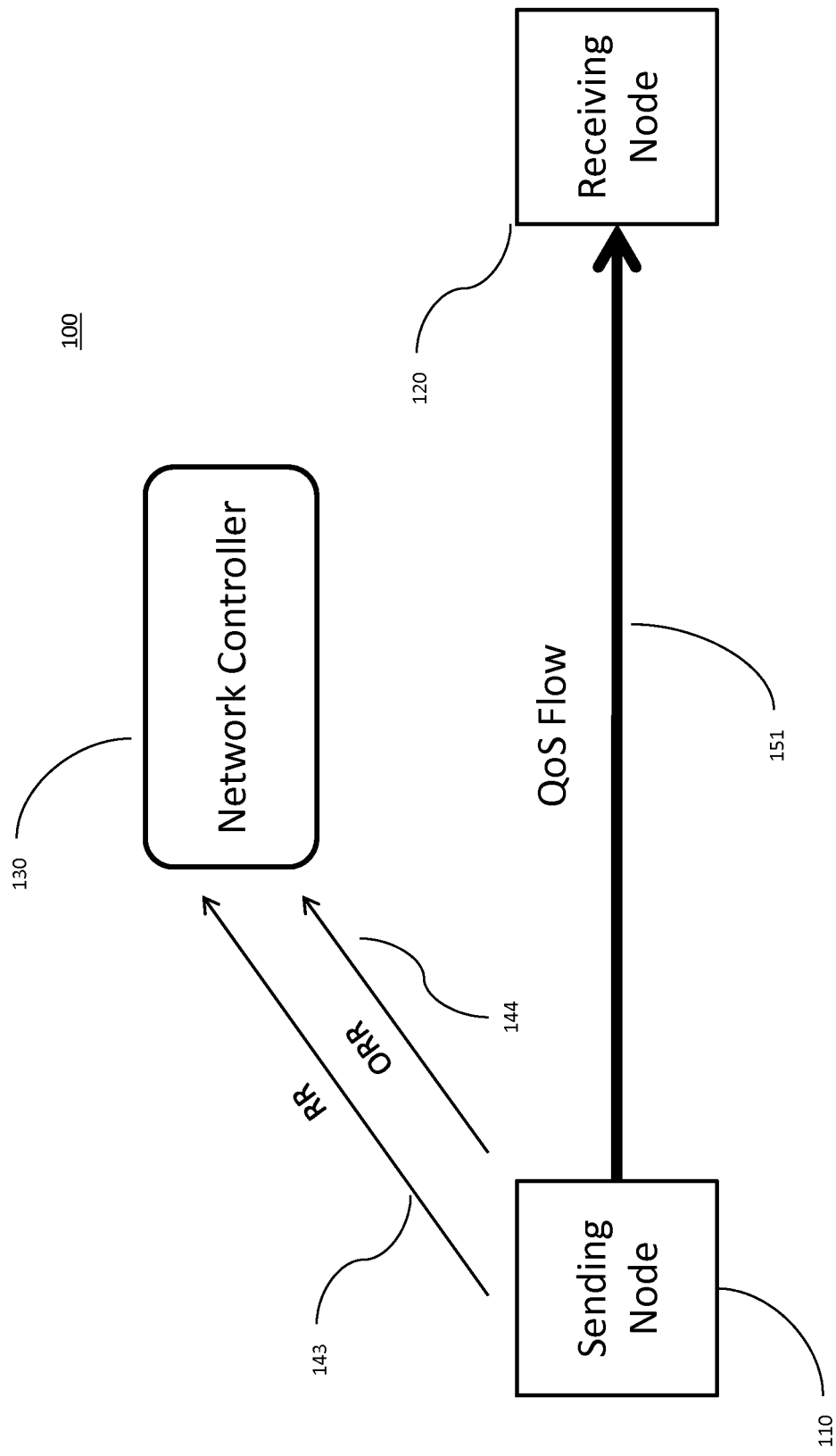
FIG. 1B shows a schematic diagram of an exemplary implementation of messages exchanged during a request for bandwidth.

FIG. 1B shows an exemplary network 100 comprising a sending node 110, a receiving node 120 and a network controller 130. The QoS flow 151 is established between sending node 110 and receiving node 130. The QoS flow may be the result of a positive response 141 to an allocation request 140.

Each time bandwidth is required for QoS flow 151, the sending node 110 sends a RR 143 to the network controller 130. Priority will be given to these requests over some other requests. In an embodiment of the disclosure described below, the sending node 110 is self-policing and limits the number of RRs sent in a particular time period. If additional bandwidth is required, the sending node 110 will make an ORR 144 to network controller 130. As described above, the network controller will give less priority to an ORR than a RR thereby maintaining a suitable level of service for all flows in the network.

Although only a single RR and a single ORR are shown, the diagram merely illustrates exemplary requests. Multiple RR and multiple ORR are contemplated and included within the scope of the disclosure.

Figure 2:
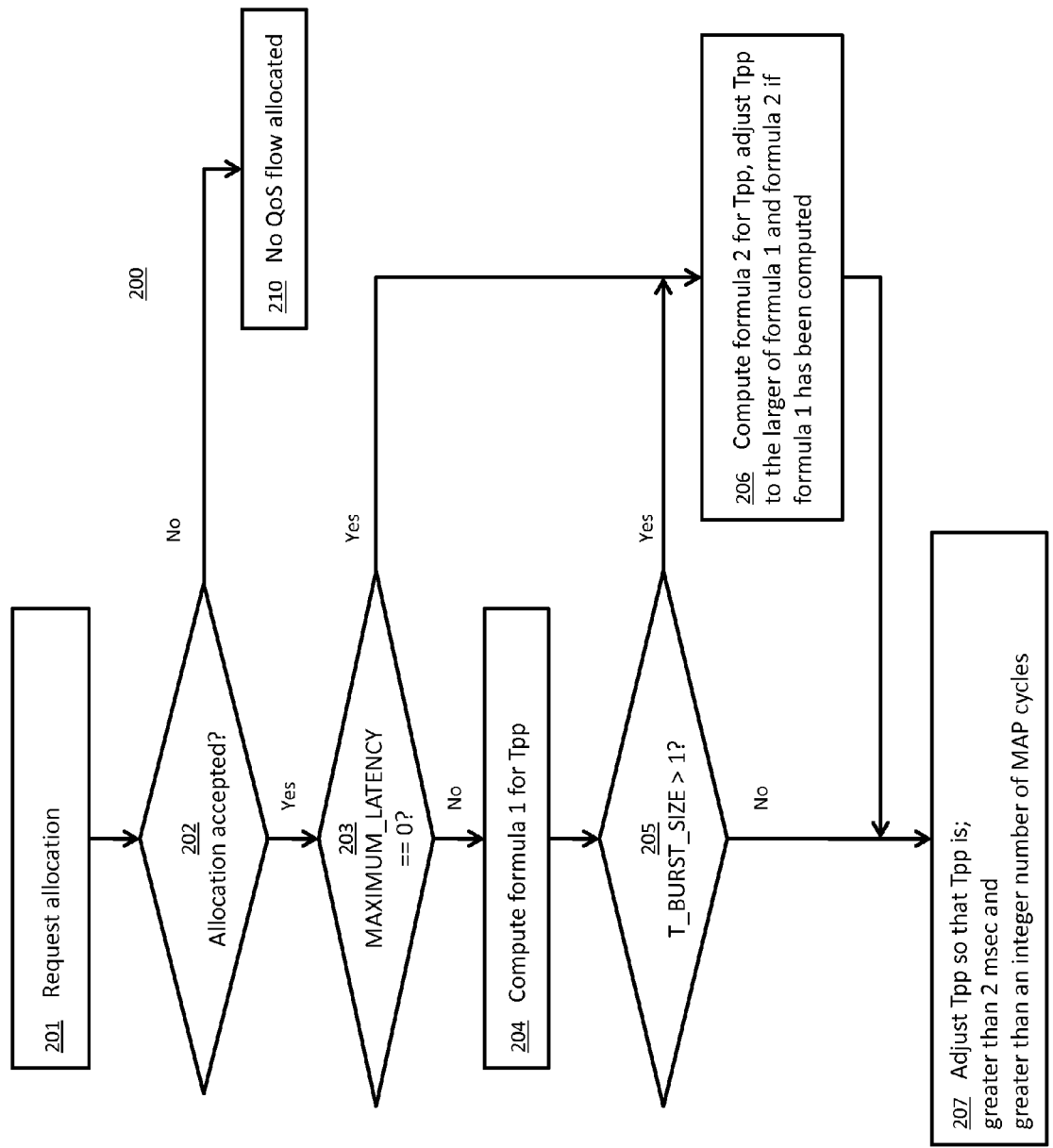
FIG. 2 is an example of a flow chart for calculating a policing window size.

Policing of the output of a sending node 110 is performed by regulating both the number of packets and the number of bits in a particular time window. FIG. 2 shows an illustrative policing window algorithm 200 for computing a suitable policing time period (Tpp).

At step 201 an allocation request 140 is made for a QoS flow. At step 202 the allocation response 141 is received; if the response is not accepted, then a QoS flow is not allocated at step 210. If the allocation is accepted, then a calculation is made for the policing parameters according to the Traffic SPECification (TSPEC) of the QoS flow 151.

If the MAXIMUM_LATENCY is specified at step 203 (i.e., max latency is equal to the time of a beginning of a burst arriving at the Ethernet Convergence Layer ("ECL") to a beginning of the next burst arriving at the ECL), then Tpp may be computed via a first formula at step 204 as shown here.

P=floor[MAXIMUM_LATENCY*(T_PEAK_DATA_RATE/(T_PACKET_SIZE*8))], where floor is made with respect to the minimum duration to transmit an integer number of packets.

P=max (P,1), P cannot be smaller than 1 millisecond

Tpp=$P*T\_PACKET\_SIZE*8/T\_PEAK\_DATA\_RATE$

If the MAXIMUM_LATENCY is not specified at step 203, then Tpp may be computed via a second formula at step 206 shown here. A latency of a packet is understood to refer to a period of time that begins at the time an Ethernet packet arrives at an Ingress Node until the time that it arrives at the Ethernet port of the Egress node. An ingress node is the MoCA node that transmits the packet; the Egress node is the MoCA node that receives the packet. The maximum latency of the flow is the largest allowed latency of packets of that flow. Accordingly, for the purposes of this application, MAXIMUM_LATENCY may be understood to refer to the maximum allowable latency of a flow of data with regard to a packet.

$T\_BURST\_SIZE*T\_PACKET\_SIZE*8/T\_PEAK\_DATA\_RATE$.

Each of the parameters in the formulas is established by the TSPEC for the QoS flow 151. The TSPEC is set by the allocation request 140. T_BURST_SIZE may be the maximum number of consecutive packets. T_PACKET_SIZE—e.g., the standard size of a packet—may be characterized in bytes. T_PEAK_DATA_RATE may be the maximum data rate for the network in bits per second. Multiplying the packet size in by 8 converts from bytes to bits and yields a time for Tpp. Typical times are in milliseconds as shown in the table below.

| MAX_LATENCY | T_BURST_SIZE | PEAK_DATA_RATE (Mbps) | PACKET_SIZE (Bytes) | Tpp (mSec) | Packet Credit | Bit Credit |
|---|---|---|---|---|---|---|
| 0 | 10 | 10 | 1518 | 12.14 | 10 | 121440 |
| 12 | 4 | 10 | 1518 | 10.93 | 9 | 109296 |
| 0 | 1 | 5 | 1518 | 2.43 | 1 | 12144 |
| 25 | 1 | 5 | 1518 | 2.43 | 1 | 12144 |
| 0 | 8 | 20 | 1518 | 4.86 | 8 | 97152 |
| 5 | 8 | 20 | 1518 | 4.86 | 8 | 97152 |

After the first formula is computed at step 204, a check is made for the T_BURST_SIZE value at step 205. If the T_BURST_SIZE is greater than 1, then Tpp may be computed again via the second formula at step 206. The larger of the two Tpp computations may be used as the final Tpp.

An adjustment for Tpp can be made at step 207. At step 207 Tpp is adjusted so that it is preferably equal to or larger than 2 milliseconds and rounds to the time of an integer number of packets arriving at the ECL.

Once a Tpp is established, a bound for the usage of the network 100 is established. An allocation, or credit, may be set for credit parameters. The credit parameters may include the number of packets and the number of bits that can be sent in one Tpp and may be computed as follows.

PacketCredit=$T\_BURST\_SIZE$

BitCredit=PacketCredit*$T\_PACKET\_SIZE$*8

Figure 3:
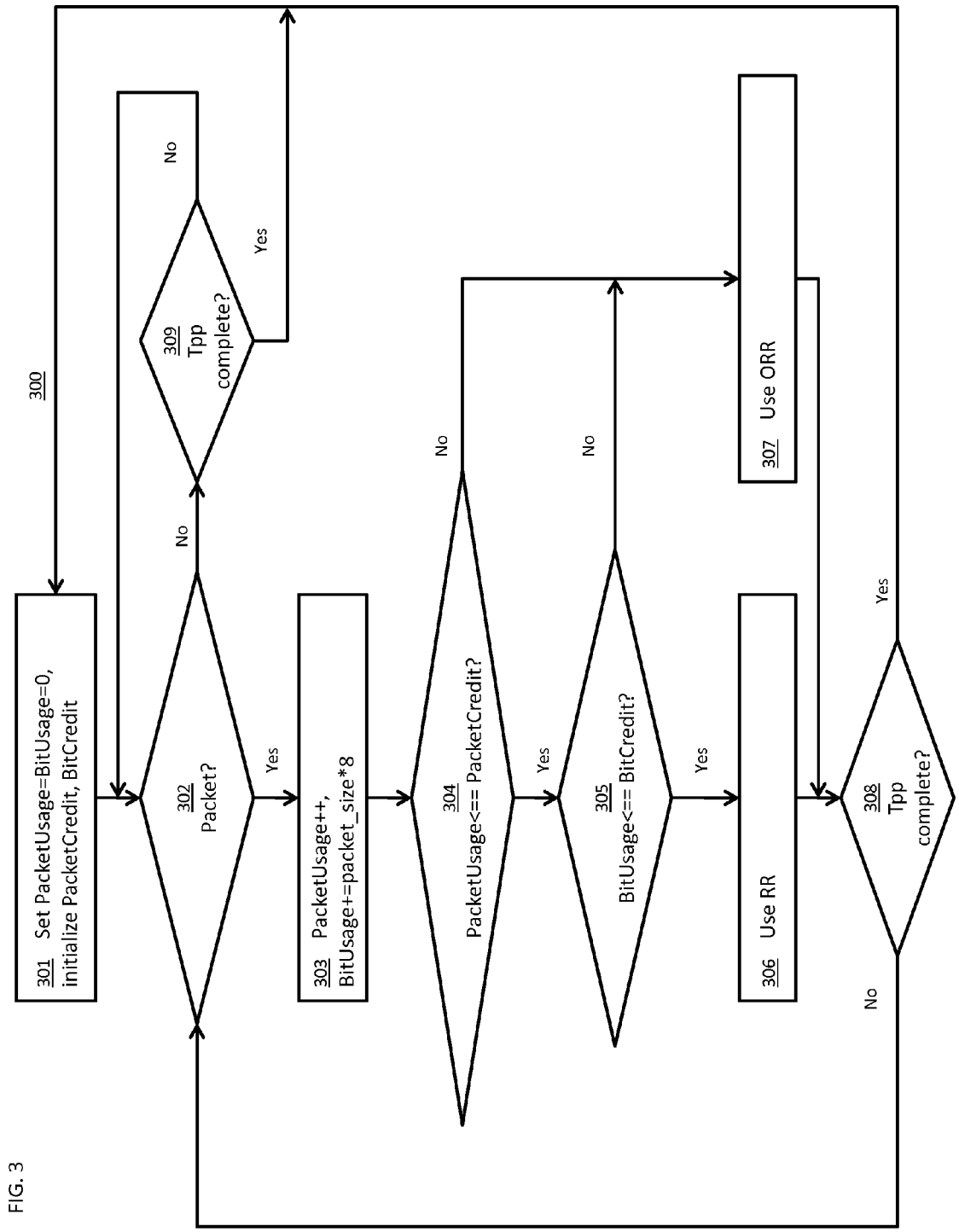
FIG. 3 is an example of a flow chart for the policing of a QoS flow.

FIG. 3 shows an illustrative policing algorithm 300 for regulating the amount of data sent in one Tpp. The policing algorithm 300 is preferably executed for each Tpp so long as the QoS flow 151 is operational. At step 301 usage parameters may be initialized. The usage parameters may include PacketUsage and BitUsage. The variables PacketUsage and BitUsage may be initialized to zero. Also in step 301, the variables PacketCredit and BitCredit may be initialized according to the formula shown above. The variables PacketCredit and BitCredit may be initialized prior to the execution of policing 300.

At step 302 the policing algorithm 300 waits for a packet to be available for sending by the sending node 110. If a packet is not available then a check is made at step 309 to see if the Tpp has expired. If Tpp has not expired that the policing algorithm 300 returns to step 302. If the Tpp has expired than the policing algorithm 300 begins again at step 301. If a packet arrives then step 303 accumulates the usage by the QoS flow in the variables PacketUsage and BitUsage as follows.

PacketUsage=PacketUsage+1

BitUsage=BitUsage+(packet_size*8)

At step 304 a check is made to see if the allocation for PacketUsage has been exceeded. At step 305 a check is made to see if the allocation for BitUsage has been exceeded. If either allocation has been exceeded, an ORR 144 is sent to the network controller 130 by the sending node 110 to reserve bandwidth opportunistically at step 307. If neither allocation has been exceeded, an RR is sent to the network controller 130 by the sending node 110 to reserve bandwidth with QoS priority at step 306.

After the execution of step 306 or step 307, a check is made at step 308 to see if the Tpp has expired. If the Tpp has not expired, then the policing algorithm 300 returns to step 302. If the Tpp has expired, then the policing algorithm 300 begins again at step 301.

Although the network and methods of the disclosure are shown with regards to a MoCA 2.0 network, the same system and methods could be applied to other suitable networks. Some modification may be required to match the essential methods to the new network but these will be obvious to those of normal skill in the art.

Thus, systems and methods for policing a MoCA QoS flow have been provided.

Aspects of the disclosure have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

What is claimed is:

1. A method of policing a flow in a home network, the method comprising:
   calculating a policing period;
   calculating a first credit parameter;
   initializing a first usage variable at a beginning of the policing period;
   receiving, at an ingress node, a packet;
   for the packet received during the policing period, calculating the first usage variable based on a first formula;
   determining whether the first usage variable is less than or equal to the first credit parameter;
   making a reservation request, by the ingress node, when the first usage variable is less than or equal to the first credit parameter,
   wherein the reservation request is different from an opportunistic reservation request.

2. The method of claim 1, comprising:
   calculating a second credit parameter; and
   initializing a second usage variable at the beginning of the policing period.

3. The method of claim 2, comprising:
   for the packet received during the policing period, calculating the second usage variable based on a second formula; and
   determining whether the second usage variable is less than or equal to the second credit parameter,
   wherein the making a reservation request comprises making the reservation request when the first usage variable is less than or equal to the first credit parameter and when the second usage variable is less than or equal to the second credit parameter.

4. The method of claim 3, wherein
   the policing period is represented as $T_{pp}$,
   one policing period represents one $T_{pp}$,
   the first credit parameter represents a packet credit,
   the second credit parameter represents a bit credit,
   the first usage variable represents a packet usage, and
   the second usage variable represents a bit usage.

5. The method of claim 3, wherein
   the calculating a first credit parameter comprises calculating a packet credit based on a burst size, and
   the calculating a second credit parameter comprises calculating a bit credit based on a packet size.

6. The method of claim 3,
   wherein the calculating the first usage variable based on a first formula is represented as:

PacketUsage=PacketUsage+1, where the first usage variable is PacketUsage, and
   wherein the calculating the second usage variable based on a second formula is represented as:

BitUsage=BitUsage+PacketSize, where the second usage variable is BitUsage, and PacketSize is a size of the received packet in bits.

7. The method of claim 3, comprising:
   determining whether an end of the policing period is reached, wherein the initializing a first usage variable and the initializing a second usage variable are performed at a beginning of each policing period, and wherein the calculating the first usage variable, the calculating the second usage variable, the determining whether the first usage variable is less than or equal to the first credit parameter, the determining whether the second usage variable is less than or equal to the second credit parameter, and the making the reservation request when the first usage variable is less than or equal to the first credit parameter and when the second usage variable is less than or equal to the second credit parameter are performed for each packet received during a respective policing period.

8. The method of claim 3, comprising:

making the opportunistic reservation request, by the ingress node, when the first usage variable is greater than the first credit parameter or when the second usage variable is greater than the second credit parameter.

9. A system, comprising:

a computer-readable storage medium; and a processing system for policing a flow, the processing system configured to facilitate:
calculating a policing period;
calculating a first credit parameter;
initializing a first usage variable at a beginning of the policing period;
calculating the first usage variable based on a first formula;
determining whether the first usage variable is less than or equal to the first credit parameter; and
using a request representing a reservation request when the first usage variable is less than or equal to the first credit parameter,
wherein the reservation request is different from an opportunistic reservation request.

10. The system of claim 9, wherein the processing system is configured to facilitate:
calculating a second credit parameter;
initializing a second usage variable at the beginning of the policing period;
calculating the second usage variable based on a second formula; and
determining whether the second usage variable is less than or equal to the second credit parameter,
wherein the using a request comprises using the request representing the reservation request when the first usage variable is less than or equal to the first credit parameter and when the second usage variable is less than or equal to the second credit parameter.

11. The system of claim 10, wherein the policing period is represented as Tpp, one policing period represents one Tpp, the first credit parameter represents a packet credit, the second credit parameter represents a bit credit, the first usage variable represents a packet usage, and the second usage variable represents a bit usage, wherein the calculating a first credit parameter comprises calculating the packet credit based on a burst size, and wherein the calculating a second credit parameter comprises calculating the bit credit based on a packet size.

12. The system of claim 10, wherein the calculating the first usage variable based on a first formula is represented as:

$$PacketUsage = PacketUsage + 1,$$

where the first usage variable is PacketUsage, and wherein the calculating the second usage variable based on a second formula is represented as:

$$BitUsage = BitUsage + PacketSize,$$

where the second usage variable is BitUsage, and PacketSize is a size of a received packet in bits.

13. The system of claim 10, wherein the processing system is configured to facilitate:
determining whether an end of the policing period is reached,
at a beginning of each policing period, initializing a first usage variable and initializing a second usage variable, and
for each packet received during a respective policing period, calculating the first usage variable, calculating the second usage variable, determining whether the first usage variable is less than or equal to the first credit parameter, determining whether the second usage variable is less than or equal to the second credit parameter, and using the request representing the reservation request when the first usage variable is less than or equal to the first credit parameter and when the second usage variable is less than or equal to the second credit parameter.

14. The system of claim 10, wherein the processing system is configured to facilitate:
using the opportunistic reservation request when the first usage variable is greater than the first credit parameter or when the second usage variable is greater than the second credit parameter.

15. A computer program product comprising instructions stored in a tangible computer-readable storage medium, the instructions comprising:
instructions for calculating a policing period;
instructions for calculating a first credit parameter;
instructions for initializing a first usage variable;
instructions for calculating the first usage variable based on a first formula;
instructions for determining whether the first usage variable is less than or equal to the first credit parameter; and
instructions for using a request representing a reservation request when the first usage variable is less than or equal to the first credit parameter,
wherein the reservation request is different from an opportunistic reservation request.

16. The computer program product of claim 15, wherein the instructions comprise:
instructions for calculating a second credit parameter;
instructions for initializing a second usage variable;
instructions for calculating the second usage variable based on a second formula; and
instructions for determining whether the second usage variable is less than or equal to the second credit parameter,
wherein the instructions for using a request comprise instructions for using the request representing the reservation request when the first usage variable is less than or equal to the first credit parameter and when the second usage variable is less than or equal to the second credit parameter.

17. The computer program product of claim 16, wherein the policing period is represented as Tpp, one policing period represents one Tpp, the first credit parameter represents a packet credit, the second credit parameter represents a bit credit, the first usage variable represents a packet usage, and the second usage variable represents a bit usage, wherein the instructions for calculating a first credit parameter comprise instructions for calculating the packet credit based on a burst size, and wherein the instructions for calculating a second credit parameter comprise instructions for calculating the bit credit based on a packet size.

18. The computer program product of claim 16, wherein the instructions for calculating the first usage variable based on a first formula are represented as:

PacketUsage=PacketUsage+1, where the first usage variable is PacketUsage, and wherein the instructions for calculating the second usage variable based on a second formula are represented as:

BitUsage=BitUsage+PacketSize, where the second usage variable is BitUsage, and PacketSize is a size of a received packet in bits.

19. The computer program product of claim 16, wherein the instructions comprise:

instructions for determining whether an end of the policing period is reached, at a beginning of each policing period, instructions for initializing a first usage variable and initializing a second usage variable, and for each packet received during a respective policing period, instructions for calculating the first usage variable, calculating the second usage variable, determining whether the first usage variable is less than or equal to the first credit parameter, determining whether the second usage variable is less than or equal to the second credit parameter, and using the request representing the reservation request when the first usage variable is less than or equal to the first credit parameter and when the second usage variable is less than or equal to the second credit parameter.

20. The computer program product of claim 16, wherein the instructions comprise:

instructions for using the opportunistic reservation request when the first usage variable is greater than the first credit parameter or when the second usage variable is greater than the second credit parameter.

* * * * *